United States Patent
Rudd et al.

(10) Patent No.: US 7,143,270 B1
(45) Date of Patent: Nov. 28, 2006

(54) SYSTEM AND METHOD FOR ADDING AN INSTRUCTION TO AN INSTRUCTION SET ARCHITECTURE

(75) Inventors: Kevin W. Rudd, Portland, OR (US); Allan D. Knies, San Francisco, CA (US); Dale C. Morris, Steamboat Springs, CO (US); James M. Hull, Saratoga, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 341 days.

(21) Appl. No.: 10/769,203

(22) Filed: Jan. 30, 2004

(51) Int. Cl.
G06F 9/44 (2006.01)
(52) U.S. Cl. .................................................. 712/227
(58) Field of Classification Search ................ 712/227; 717/122, 124, 168, 170
See application file for complete search history.

(56) References Cited

U.S. PATENT DOCUMENTS

| | | | |
|---|---|---|---|
| 5,859,999 A | 1/1999 | Morris et al. | |
| 6,009,512 A * | 12/1999 | Christie | ........................ 712/226 |
| 6,023,751 A * | 2/2000 | Schlansker et al. | ............ 712/1 |
| 6,157,996 A | 12/2000 | Christie et al. | |
| 6,353,883 B1 | 3/2002 | Grochowski et al. | |
| 6,512,706 B1 | 1/2003 | Arnold et al. | |
| 6,622,238 B1 | 9/2003 | Benjamin et al. | |
| 6,631,465 B1 * | 10/2003 | Chen et al. | .................. 712/234 |
| 6,918,030 B1 * | 7/2005 | Johnson | ..................... 712/225 |
| 6,983,361 B1 * | 1/2006 | Blandy | ........................ 712/236 |
| 6,986,025 B1 * | 1/2006 | Wilson | ........................ 712/226 |
| 7,093,108 B1 * | 8/2006 | Swaine | ........................ 712/227 |
| 2002/0091996 A1 | 7/2002 | Topham | |

* cited by examiner

*Primary Examiner*—Eric Coleman

(57) ABSTRACT

A processor comprising a feature indicator associated with at least one of a first sequence of one or more instructions, a first register, a second register, and an execution core is provided. The execution core is configured to execute a second instruction to cause the first register to be set to a first value using the feature indicator and to cause the second register to be set to a second value using the feature indicator. The execution core is configured to execute the first sequence of one or more instructions to cause a function to be performed in response to the first value in the first register indicating a true condition, and the execution core is configured to execute a second sequence of one or more instructions to cause the function to be performed in response to the second value in the second register indicating the true condition.

26 Claims, 5 Drawing Sheets

```
212 → setf.sig   f1 = r1           // copy first operand from GR to FR
214 → setf.sig   f2 = r2           // copy second operand from GR to FR
220 → ;;
216 → xma.lu     f3 = f1, f2, f0   // multiply using the FRs
222 → ;;
218 → getf.sig   r3 = f3           // copy result from FR to GR
```

210 Fig. 2a

```
232 → mpy.lu    r3 = r1, r2    // multiply using the GRs
```

230 Fig. 2b

```
                                      620
602 → tfeature     p1, p2 = (mpy feature)  // set PRs
614 → ;;
604 → (p1) mpy.lu     r3 = r1, r2    // if (new) multiply using the GRs
606 → (p2) setf.sig   f1 = r1        // if (old) copy first operand from GR to FR
608 → (p2) setf.sig   f2 = r2        // if (old) copy second operand from GR to FR
616 → ;;
610 → (p2) xma.lu     f3 = f1, f2, f0 // if (old) multiply using the FRs
618 → ;;
612 → (p2) getf.sig   r3 = f3        // if (old) copy result from FR to GR
```

600 Fig. 6

SYSTEM AND METHOD FOR ADDING AN INSTRUCTION TO AN INSTRUCTION SET ARCHITECTURE

BACKGROUND OF THE INVENTION

Computer systems typically include a processor and a memory that stores programs that are executable by the processor. A program that is executable by a processor consists of instructions from the "instruction set architecture" associated with the processor. The instruction set architecture defines the instructions that are supported by a processor. The instruction set architecture for a family of processors typically remains fairly stable over time. As a result, programs that are written for one processor from a family are usually compatible with other processors from the family.

The desire for compatibility between programs and processors of the same family can create constraints on innovations for a processor family. To add a new instruction to an instruction set architecture, for example, steps need to be taken to ensure that previous versions of processors from a family of processors can correctly handle the new instruction. Unfortunately, such steps may be difficult to implement and may result in a heavy performance penalty for the previous versions of the processors. The difficulty and performance penalty can be so large as to make adding a new instruction to the instruction set architecture infeasible.

One approach that has been employed in prior-art systems is to add a new instruction using an instruction encoding which is reserved on older processors, meaning that older processors trigger an interruption when an attempt is made to execute the instruction encoding. Software, then, in the interruption handler can be provided to emulate the function of the new instruction on older processors that do not support it. However, the performance penalty of interrupting the processor and executing the code to emulate the new instruction is typically quite high—on the order of 10's to 100's of cycles at best.

It would be desirable to be able to add new instructions to an instruction set architecture of a family of processors while maintaining compatibility with previous versions of processors from the family and while providing for good performance on both old and new processors.

SUMMARY OF THE INVENTION

According to an exemplary embodiment, the present disclosure provides a processor comprising a feature indicator associated with at least one of a first sequence of one or more instructions, a first register, a second register, and an execution core. The execution core is configured to execute a second instruction to cause the first register to be set to a first value using the feature indicator and to cause the second register to be set to a second value using the feature indicator. The execution core is configured to execute the first sequence of one or more instructions to cause a function to be performed in response to the first value in the first register indicating a true condition, and the execution core is configured to execute a second sequence of one or more instructions to cause the function to be performed in response to the second value in the second register indicating the true condition.

BRIEF DESCRIPTION OF THE DRAWINGS

FIG. 2a is a diagram illustrating a first code segment for performing a function.

FIG. 2b is a diagram illustrating a second code segment for performing a function.

FIG. 6 is a diagram illustrating a third code segment for performing a function.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

According to one embodiment of the present disclosure, a system and method for allowing a new instruction to be added to an instruction set architecture of a processor in a computer system is provided. To use the new instruction, a compiler generates a code segment that includes a predicate-producing instruction, the new instruction, and a set of old instructions configured to perform the same function as the new instruction.

For a processor that supports the new instruction, the predicate-producing instruction causes a pair of predicate registers to be set to complementary values in accordance with a value of a feature indicator associated with the new instruction. The values in the predicate registers cause the new instruction to be executed to perform the function and cause the set of old instructions to be executed as no-operations (NOPs).

For a processor that does not support the new instruction, the predicate-producing instruction causes a pair of predicate registers to be set to complementary values in accordance with either the feature indicator or a bit associated with a general purpose register. The values in the predicate registers cause the new instruction to be executed as NOP and cause the set of old instructions to be executed to perform the function.

These aspects of the present disclosure may be employed with any type of computer system that includes a microprocessor or microcontroller-based architecture such as a personal computer, a laptop, a server, a personal digital assistant (PDA), a mobile telephone, a printer, a multi-function device, a gaming device, a television or other video device, or an audio device. Selected portions of an embodiment of a computer system 100 are shown in FIG. 1.

Figure 1:
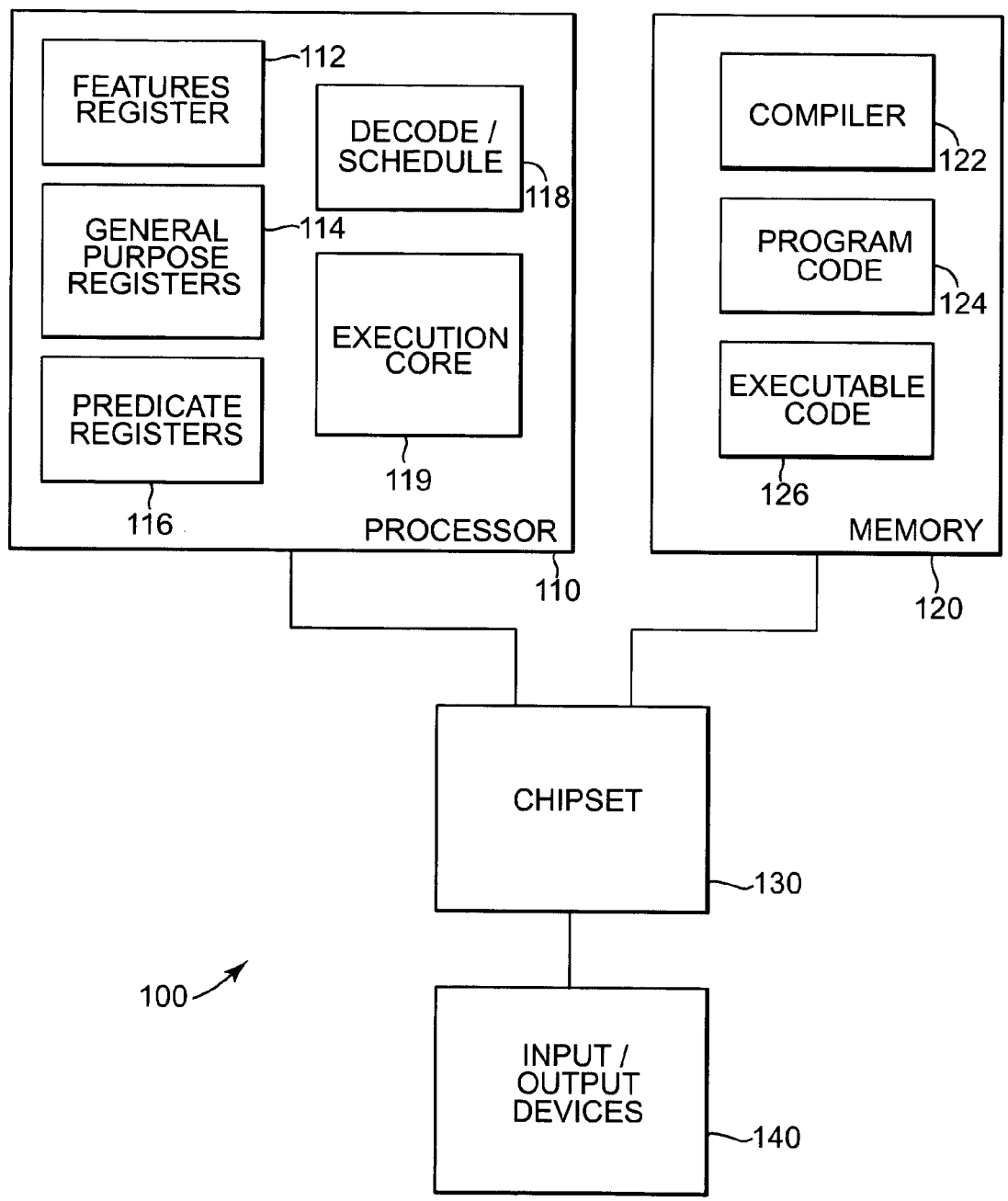
FIG. 1 is a block diagram illustrating an embodiment of selected portions of a computer system.

In FIG. 1, computer system 100 comprises a processor 110, a memory system 120, a chipset 130, and input/output (I/O) devices 140. Processor 110 comprises a features register 112, general purpose registers 114, predicate registers 116, a decode/schedule block 118, and an execution core 119. Memory 120 comprises a compiler 122, program code 124, and executable code 126.

Processor 110 is configured to execute instructions from an instruction set architecture using decode/schedule block 118 and execution core 119. The instruction set architecture of processor 110 comprises a set of instructions that are supported by processor 110. Decode/schedule block 118 receives sets of instructions, decodes the instructions, and schedules the instructions for execution by execution core 119. Execution core 119 comprises one or more execution units configured to execute instructions according to the instruction set architecture of processor 110 using features register 112, general purpose registers 114, and predication registers 116.

In the embodiment of FIG. 1, processor 110 comprises a processor from the Itanium® family of processors available from Intel. Accordingly, processor 110 comprises execution core 119 that is configured to execute instructions from the Itanium® family instruction set architecture in this embodiment. In other embodiments, processor 110 may be another type of processor. In addition, other embodiments may include multiple processors 110.

Computer system 100 is configured to execute compiler 122 using processor 110. Compiler 122 comprises a set of instructions configured to cause executable code 126 to be generated from program code 124. Program code 124 comprises software written in a high level programming language. To generate executable code 126, compiler 122 compiles program code 124 by converting the high level programming language of program code 124 into machine language using instructions from the instruction set architecture of processor 110. Executable code 126 comprises a set of instructions executable by processor 110. Compiler 122, program code 124, and executable code 126 may be copied into memory 120 from one or more I/O devices 140, such as a hard disk drive or a CD-ROM drive, prior to being executed by processor 110.

The instructions of the instruction set architecture of processor 110 are each configured to cause a defined function to be performed. The instruction set architecture of processor 110 may not include an instruction that performs a desired function, however. As described herein, new instructions may be added to the instruction set architecture to allow additional defined functions to be performed while maintaining backwards compatibility with previous versions of processors that implement previous versions of the instruction set architecture.

FIG. 2*a* is a diagram illustrating a first code segment 210 for performing a function in computer system 100. The function illustrated in FIG. 2*a* is an integer multiply using general purpose registers 114. As shown in FIG. 2*a*, an integer multiply using general purpose registers 114 may be performed using instructions from the instruction set architecture of processor 110.

To accomplish this function, instructions 212 and 214 cause first and second operands to be copied from general purpose registers r1 and r2 in general purpose register set 114 to floating-point registers f1 and f2 (not shown in FIG. 1), respectively. Instruction 216 causes the first and second operands to be multiplied and causes the result to be stored in a floating-point register f3. Instruction 218 then causes the result to be copied from the floating-point register f3 into a general purpose register r3 in general purpose registers 114. Tokens 220 and 222 are used to indicate that subsequent instructions, i.e., instruction 216 and instruction 218, respectively, are to be started in a new clock cycle as the instructions may be data dependent on previous instructions.

Although the integer multiply using general purpose registers 114 function may be performed using code segment 210, the latency to execute the instructions of code segment 210 may be 15 cycles or even longer.

FIG. 2*b* is a diagram illustrating a second code segment 230 for performing the same function as code segment 210 using computer system 100. Code segment 230 includes an instruction 232 configured to cause the operands from general purpose registers r1 and r2 in general purpose registers 114 to be multiplied and cause the result to be stored in general purpose register r3 in general purpose registers 114.

The latency to execute instruction 232 of code segment 230 may be as short as a single cycle. Accordingly, code segment 230 may be executed more quickly that code segment 210.

Figure 3A:
FIG. 3a is a block diagram illustrating an embodiment of a reserved instruction.

Instruction 232 may be added to the instruction set architecture of processor 110 using a reserved instruction encoding that include a predication field from the instruction set architecture. FIG. 3*a* is a block diagram illustrating an embodiment of a reserved instruction 300. Reserved instruction 300 comprises a reserved portion 302 and a predication field 304. Processor 110 either executes reserved instruction 300 by taking a reserved instruction fault or executes reserved instruction 300 as a no-operation (NOP) depending on a value in the predicate register specified by predication field 304.

Figure 3B:
FIG. 3b is a block diagram illustrating an embodiment of a defined instruction.

To add an instruction to the instruction set architecture of processor 110, reserved portion 302 of reserved instruction 300 is replaced with an instruction encoding 312 for instruction 232 as illustrated by a defined instruction 310 in FIG. 3*b*. Accordingly, instruction 232, for example, may be added to the instruction set architecture of processor 110 by defining an instruction encoding for a reserved instruction that includes a predication field.

Predication field 304 specifies a predicate register in predicate registers 116. Processor 110 either executes instruction 310 normally or executes instruction 310 as a no-operation (NOP) depending on a value in the specified predicate register. If instruction 310 is executed normally, processor 110 performs a function defined by instruction 310. If instruction 310 is executed as a NOP, however, processor 110 does not perform the function defined by instruction 310 and does not change the architectural state of processor 110 in response to instruction 310. An instruction, referred to herein as a predicate-producing instruction, executed prior to instruction 310 may cause the value of the specified predicate register to be set according to one or more conditions.

In general, an instruction that is added to an instruction set architecture, i.e., a new instruction, is not supported by previous versions of a processor from the same instruction set architecture family. For compatibility, the function associated with new instructions should be performed by both current and previous versions of a processor. By encoding new instructions using reserved instructions that include predicate fields, the execution of a new instruction may be made conditional on processor support for the new instruction. As will be described below with reference to an example in FIG. 6, a code segment may be generated to include both a new instruction and a set of instructions configured to perform the same function as the new instruction. If the processor supports the new instruction, then the processor executes the new instruction to perform the function and treats the other set of instructions as NOPs. If the processor does not support the new instruction, the processor treats the new instruction as a NOP and executes the other set of instructions to perform the function.

A predicate-producing instruction will be used to determine whether a processor supports a new instruction. As described below with reference to FIG. 6, the predicate-producing instruction is encoded such that it will execute on processors that support the new instruction and processors that do not support the new instruction. In processors that support the new instruction, the predicate-producing instruction is configured to set a pair of predicate registers to complementary values using a feature indicator (shown in FIG. 4) in features register 112. In processors that do not support the new instruction, the predicate-producing instruction is configured to set a pair of predicate registers to complementary values using either the feature indicator or a NaT bit (shown in FIG. 5) in general purpose registers 114.

Figure 4:
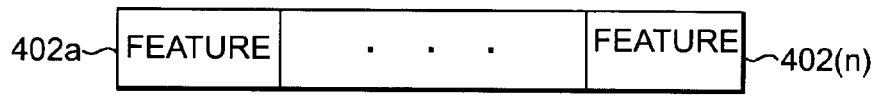
FIG. 4 is a block diagram illustrating an embodiment of a features register.

FIG. 4 is a block diagram illustrating an embodiment of features register 112. Features register 112 comprises a plurality of feature indicators 402a through 402(n), where n is greater than zero and represents the nth feature indicator 402(n). Each feature indicator 402 includes a value to indicate the presence or absence of a particular feature of processor 110. For example, each feature indicator 402 may comprise one bit that contains a "1" if an associated feature is present and a "0" if an associated feature is absent.

As part of adding a new instruction, such as instruction 232, to an instruction set architecture, a features indictor 402 in features register 112 associated with the new instruction is defined to indicate the presence of the feature associated with the new instruction. Accordingly, a processor 110 that implements the instruction set architecture with the new instruction includes a features indictor 402 in features register 112 that is set to indicate that the new instruction is supported by processor 110, e.g., by setting the feature indicator 402 to a "1". In processors that do not implement the instruction set architecture with the new instruction, the feature indicator 402 associated with the new instruction either is not present or is set to indicate that the new instruction is not supported by processor 110, e.g., by setting the feature indicator 402 to a "0".

In an embodiment where processor 110 comprises a processor from the Itanium® family of processors, features register 112 may be a CPUID register as defined by the Itanium® family of processors. In particular, feature indicators 402 may be included in CPUID[4].

Figure 5:
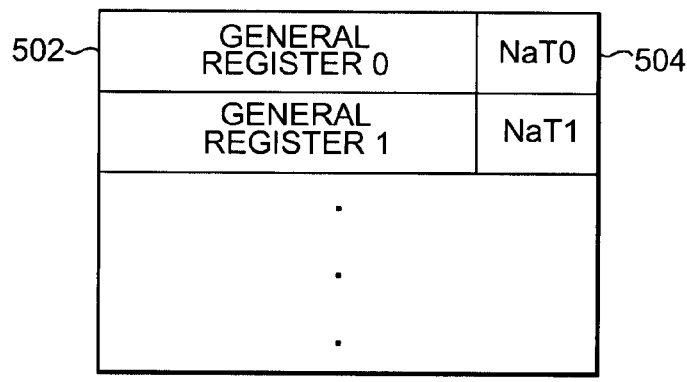
FIG. 5 is a block diagram illustrating an embodiment of a general purpose register set.

FIG. 5 is a block diagram illustrating an embodiment of general purpose register set 114. General purpose register set 114 includes a plurality of general registers 502 and a plurality of NaT (Not-a-Thing) bits 504. Each NaT bit 504 is associated with a general register 502. For example, NaT bit 0 (NaT0) is associated with general register 0, NaT bit 1 (NaT1) is associated with general register 1, etc. In the Itanium® family of processors, NaT0 is always set to a value of "0". Other NaT bits 504 may be set to a value of "0" or "1".

FIG. 6 is a diagram illustrating a third code segment 600 for performing the function of integer multiply using general purpose registers 114 as described above with reference to FIGS. 2a and 2b. Code segment 600 includes a predicate-producing instruction 602, a new instruction 604, and a set of old instructions 606, 608, 610, and 612. Predicate-producing instruction 602 includes a feature specifier 620, e.g., "(mpy feature)" in the example of FIG. 6. A token 614 is used to indicate a subsequent instruction, i.e., instruction 604 is to be started in a new clock cycle. New instruction 604 is configured to perform the function of instruction 232 as described above in dependence on a first predicate being true. The set of old instructions 606, 608, 610, and 612 and tokens 616 and 618 are configured to perform the functions of instructions 212, 214, 216, and 218 and tokens 220 and 222 as described above in dependence on a second predicate being true.

Figure 7A:
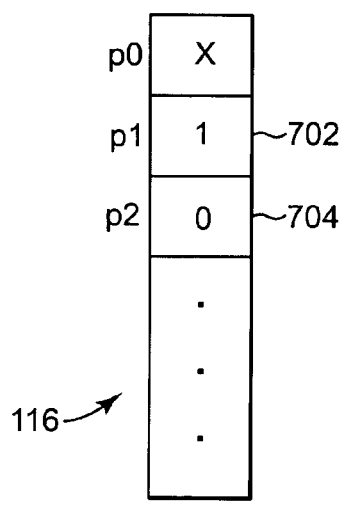
FIG. 7a is a block diagram illustrating a first example of values stored in an embodiment of a predicate register set.
Figure 7B:
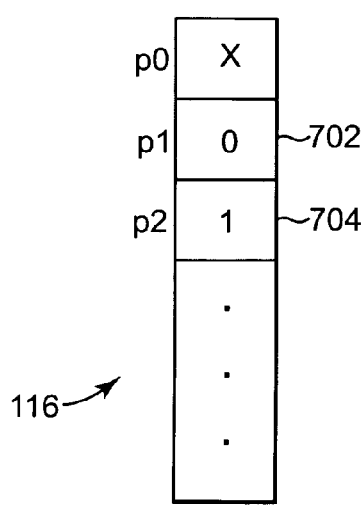
FIG. 7b is a block diagram illustrating a second example of values stored in an embodiment of a predicate register set.

Predicate-producing instruction 602 is configured to cause first and second predicate registers p1 and p2, respectively, in predicate registers 116 to be set to complementary values, i.e., "1" and "0", respectively, or "0" and "1", respectively. The values set in the first and second predicate registers depend on whether or not processor 110 supports new instruction 604, i.e., the instruction specified by feature specifier 620. FIGS. 7a and 7b illustrate examples of values stored in the first and second predicate registers of predicate register set 116. If processor 110 supports new instruction 604, then a first predicate register 702, i.e., predicate register p1, is set to a value of "1" to indicate a true condition and a second predicate register 704, i.e., predicate register p2, is set to a value of "0" to indicate a false condition as illustrated in FIG. 7a. If processor 110 does not support new instruction 604, then the first predicate register 702 is set to a value of "0" to indicate a false condition and the second predicate register 704 is set to a value of "1" to indicate a true condition as illustrated in FIG. 7b.

The Itanium® instruction set architecture includes an instruction called test NaT, "tnat". A test NaT instruction is configured to cause a pair of predicate registers to be set in accordance with a value in a specified NaT bit 504. A test NaT instruction may be configured to specify NaT0 as the specified NaT bit 504 as follows:

tnat p1, p2=r0 // set p1 and p2 using NaT0

As noted above, NaT0 is always set to a value of "0". Accordingly, a test NaT instruction that specifies NaT0 causes the pair of predicate registers p1 and p2 to be set to "0" and "1", respectively, as shown in FIG. 7b.

In one embodiment, predicate-producing instruction 602 comprises an instruction called test feature, "tfeature", as illustrated in FIG. 6. The test feature instruction is encoded with an instruction encoding that is equivalent to the test NaT instruction, "tnat", that specifies NaT0 except that the test feature instruction also includes feature specifier 620 that is encoded in an ignored field in the test NaT instruction. By using the encoding of a previously defined instruction, i.e., test NaT, predicate-producing instruction 602 may be executed on both older and newer Itanium® family processors. Newer processors, however, are configured to execute the test feature instruction to cause a different function to be performed than the function that occurs in response to the test NaT instruction being executed on older processors.

Because the test feature instruction is encoded with the same encoding as a test NaT instruction that specifies NaT0, older processors that implement the Itanium® instruction set architecture execute the test feature instruction exactly as they do a test NaT instruction that specifies NaT0 while ignoring feature specifier 620. Thus, an older processor that executes the test feature instruction shown in FIG. 6, i.e., predicate-producing instruction 602, causes the pair of predicate registers 702 and 704 to be set to "0" and "1", respectively, as shown in FIG. 7*b*.

In newer processors, the test feature instruction is configured to set the pair of predicate registers according to the value of the feature indicator 402 associated with feature specifier 620. For a new instruction, feature specifier 620 specifies the feature indicator 402 that is associated with the new instruction. In a newer processor that supports the new instruction, the feature indicator 402 associated with the new instruction is set to a "true" value, e.g., "1", to indicate processor support for the new instruction. Accordingly, the test feature instruction will cause the first and second predicate registers 702 and 704 to be set to the values shown in FIG. 7*a*, i.e., "1" and "0", respectively, in newer processors that support the feature indicated by feature specifier 620.

In newer processors that do not support the new instruction, the feature indicator 402 associated with the new instruction is set to a "false" value, e.g., "0", to indicate that the processor does not support the new instruction. Accordingly, the test feature instruction will cause the first and second predicate registers 702 and 704 to be set to the values shown in FIG. 7*b*, i.e., "0" and "1", respectively, in newer processors that do not support the feature indicated by feature specifier 620.

Because predicate-producing instruction 602 causes processor 110 to set the first and second predicate registers 702 and 704 to complementary values, either the new instruction 604 or the set of old instructions 606, 608, 610, and 612 will be executed by processor 110 according to the values in predicate registers 702 and 704.

If processor 110 supports new instruction 604, then predicate register 702 is set to indicate a true condition to cause processor 110 to execute new instruction 604 and perform the function specified by new instruction 604. In this case, predicate register 704 is set to indicate a false condition to cause processor 110 to execute old instructions 606, 608, 610, and 612 as NOPs.

If processor 110 does not support new instruction 604, then predicate register 702 is set to indicate a false condition to cause processor 110 to execute new instruction 604 as a NOP. In this case, predicate register 704 is set to indicate a true condition to cause processor 110 to execute old instructions 606, 608, 610, and 612 to perform the function.

Figure 8:
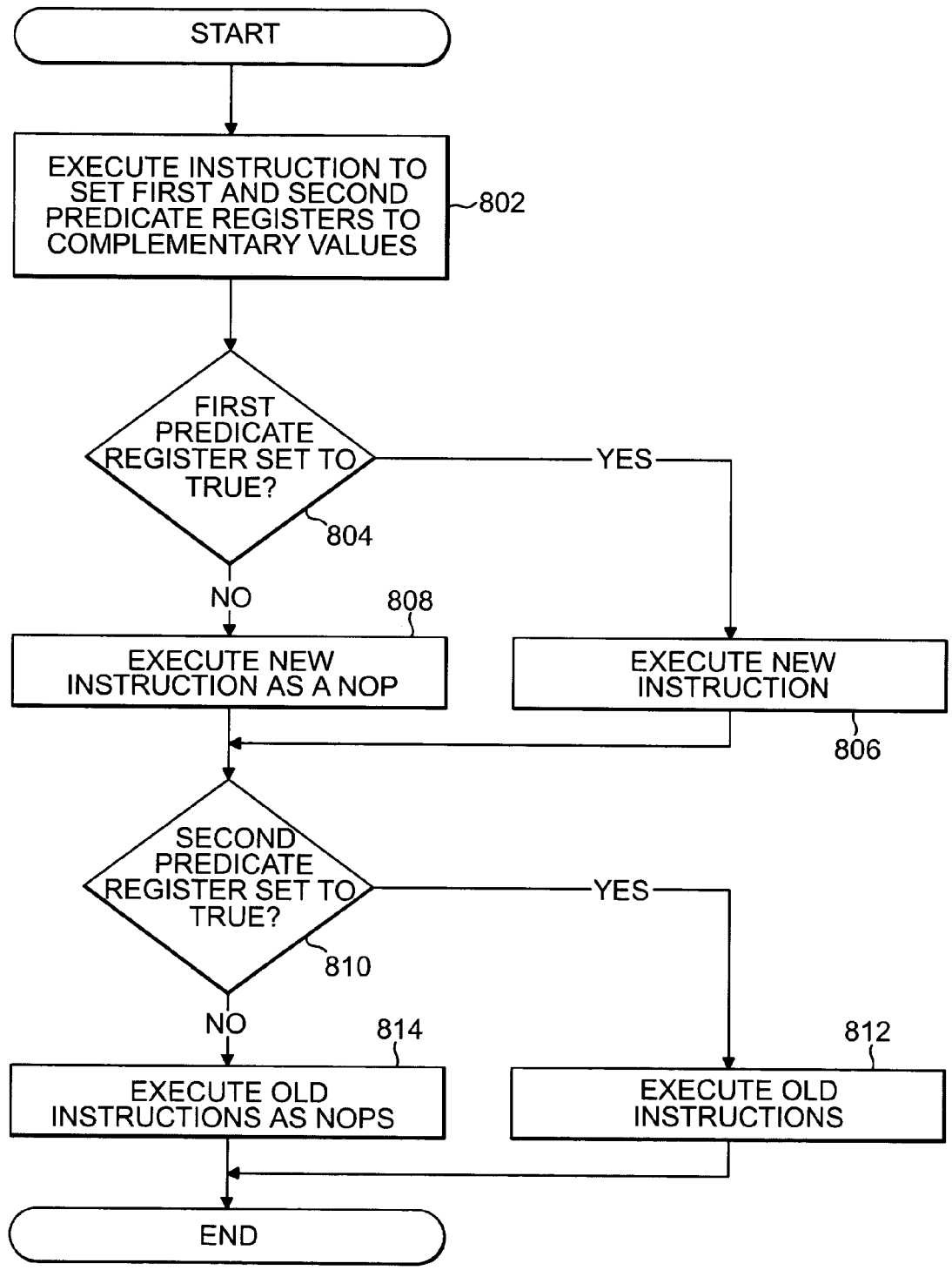
FIG. 8 is a flow chart illustrating an embodiment of a method for executing a code segment that includes a new instruction.

FIG. 8 is a flow chart illustrating an embodiment of a method for executing a code segment, such as code segment 600, which includes a new instruction, such as new instruction 604, by processor 110. In FIG. 8, an instruction is executed by processor 110 to set first and second predicate registers to complementary values as indicated in a block 802. A determination is made as to whether the first predicate register is set to a value that indicates a true condition as indicated in a block 804. If the first predicate register is set to indicate the true condition, then processor 110 supports the new instruction and the new instruction is executed to perform a function as indicated in a block 806. If the first predicate register is not set to indicate the true condition, then processor 110 does not support the new instruction and the new instruction is executed as a NOP as indicated in a block 808.

A determination is made as to whether the second predicate register is set to a value that indicates the true condition as indicated in a block 810. If the second predicate register is set to indicate the true condition, then processor 110 does not support the new instruction and the old instructions are executed to perform the function as indicated in a block 812. If the second predicate register is not set to indicate the true condition, then processor 110 supports the new instruction and the old instructions are executed as NOPs as indicated in a block 814.

Figure 9:
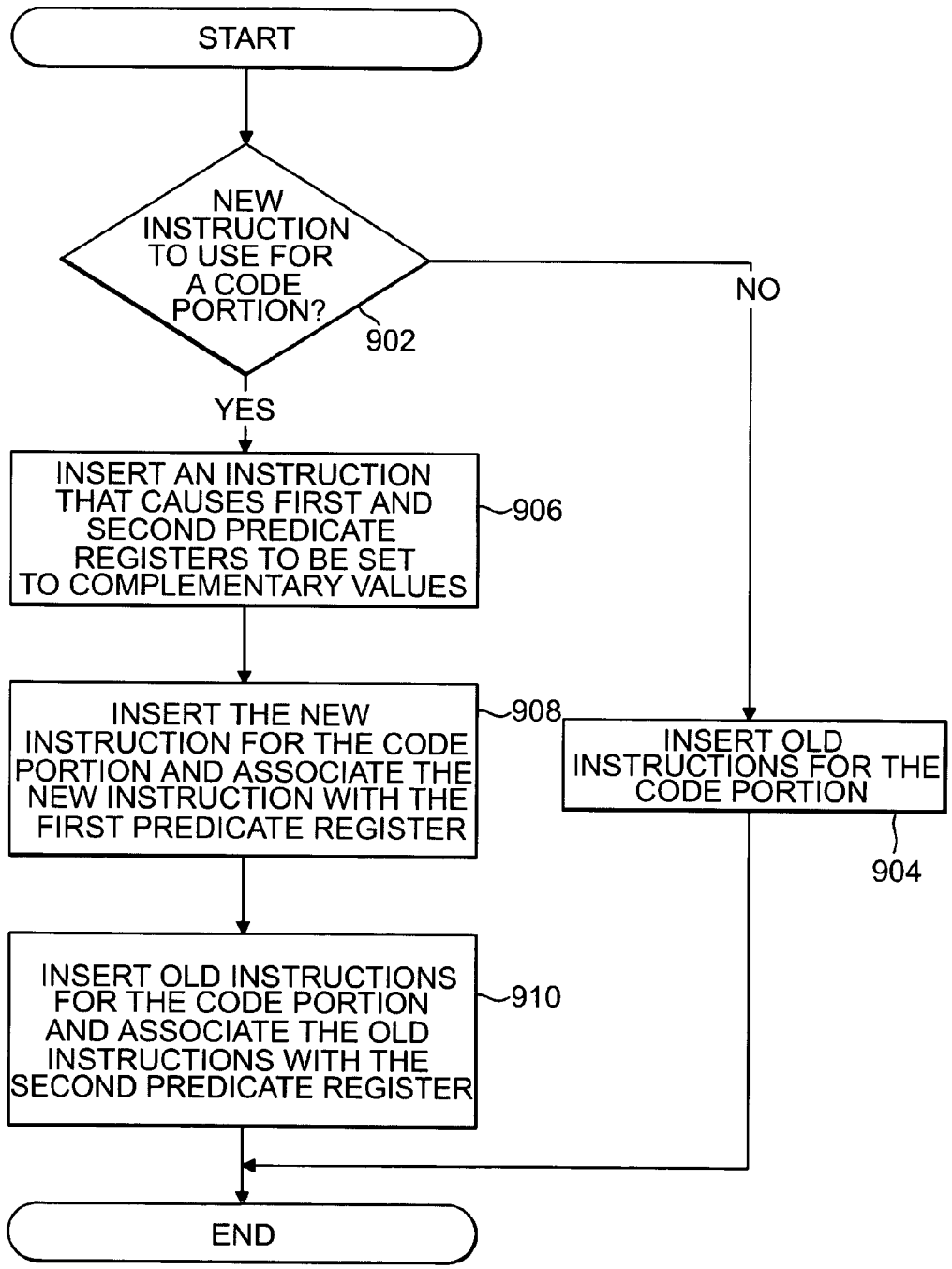
FIG. 9 is a flow chart illustrating an embodiment of a method for compiling a program segment using a new instruction.

FIG. 9 is a flow chart illustrating an embodiment of a method for compiling a code portion, such as a code portion from program code 124, into a code segment, such as code segment 600 in executable code 126, using a new instruction. In FIG. 9, a determination is made by compiler 122 as to whether there is a new instruction to use for a code portion as indicated in a block 902. If there is not a new instruction to use for a code portion, then compiler 122 inserts old instructions for the code portion into a code segment, such as code segment 210, as indicated in a block 904.

If there is a new instruction to use for a code portion, the compiler 122 inserts an instruction that causes first and second predicate registers to be set to complementary values into a code segment, such as code segment 600, as indicated in a block 906. Compiler 122 inserts the new instruction for the code portion into the code segment and associates the new instruction with the first predicate register as indicated in a block 908. Compiler 122 inserts the old instructions for the code portion into the code segment and associates the old instructions with the second predicate register as indicated in a block 910.

Compiler 122 and executable code 126 may be stored in any suitable media accessible by computer system 100 including memory 120 or a media in an I/O device 140. Specific examples of a media suitable for storing compiler 122 and executable code 126 include a hard disk drive, a CD-ROM, a floppy disk, a memory card, a FLASH memory, and an MRAM device.

By using the embodiments described above, a function that previously took multiple instructions and numerous cycles to be performed may be performed by a new instruction in as little as one cycle in processors that support the new instruction. In processors that do not support the new instruction, the function may be performed without the need for instruction emulation.

Although the example shown in FIG. 6 illustrates the case where a single new instruction is defined to replace multiple old instructions, many variations are possible and contemplated. These variations include:

a) a single new instruction to replace a single old instruction;

b) a single new instruction to replace multiple old instructions (as illustrated in FIG. 6);

c) multiple new instructions to replace a single old instruction;

d) multiple new instructions to replace multiple old instructions;

e) a set of instructions that includes a single new instruction and one or more old instructions to replace a single old instruction;

f) a set of instructions that includes a single new instruction and one or more old instructions to replace multiple old instructions;

g) a set of instructions that includes multiple new instructions and one or more old instructions to replace a single old instruction;

h) a set of instructions that includes multiple new instructions and one or more old instructions to replace multiple old instructions;

To generalize these variations, a new sequence of instructions may be used to replace an old sequence of instructions.

The new sequence of instructions includes one or more new instructions and zero or more old instructions that are configured to perform a function. The old sequence of instructions includes one or more old instructions that are configured to perform the function. A predicate-producing instruction sets the predicate registers according to either a feature indicator associated with the new sequence of instructions or a NaT bit associated with a general purpose register to cause either the new sequence of instructions or the old sequence of instructions to be executed to perform the function.

Each of the variations listed above may result in enhanced performance and/or reduced power consumption in processors that support the new sequences of instructions. In each case, the new sequence of instructions may have a shorter latency than the old sequence of instructions. The shorter latency may be a result of fewer instructions in the new sequence of instructions than the old sequence of instructions. The shorter latency may also be result of one or more new instructions in the new sequence of instructions having substantially lower latencies than instructions in the old sequence of instructions.

The performance of processors that do not support a new sequence of instructions may be only minimally impacted. These processors execute the old sequence of instructions to cause the function to be performed and execute the new sequence of instructions as NOPs. The latency added to these processors may be as little as one cycle or less depending on the specific sequence of new instructions.

In addition, the new sequence of instructions does not trigger interruptions that need to be handled by an interruption handler in processors that do not support the new sequence of instructions. Accordingly, any performance penalty associated with instruction emulation may not apply.

The embodiments described above may also be used to remove an old instruction from an instruction set architecture. To do so, a new set of one or more instructions may be included in a code segment along with the old instruction and predicate instructions. New processors may be configured such that they are not capable of executing the old instruction. Instead, these processors execute the new set of instructions. Old processors may continue to execute the old instruction.

Additional forms of the test feature instruction described above may also be defined. These additional forms can include capabilities that correspond to the various forms of the test NaT instruction or other predicate-producing instructions. For example, the forms "tfeature.unc", "tfeature.and", "tfeature.or", and "tfeature.or.andcm" may be defined to perform functions that correspond to "tnat.unc", "tnat.and", "tnat.or", and "tnat.or.andcm", respectively. One or more of these forms of the test feature instruction may be used in the above embodiments to set predicate registers to the same values, i.e., values that are not complements of one another.

In the embodiments described above, the predicates generated by a predicate-producing instruction may control branch instructions in either a new or old sequence of instructions. The use of branch instructions in either a new or old sequence of instructions may be useful in cases where one of the sequences is significantly longer or larger than the other and interleaving the sequences is not desirable.

In the embodiments described above, processors that are capable of executing a new instruction may be configured to cause the execution of the new instruction to be disabled. In such a case, the feature indicator associated with the new instruction is set to "0" to indicate that the new instruction is not supported.

In an alternative embodiment, the predicate-producing instruction may set only one predicate register using the value of a feature indicator. In this embodiment, a branch instruction subsequent to the predicate-producing instruction causes either a first sequence of instructions associated with the feature indicator or a second sequence of instructions to be executed to cause a function to be performed depending on the value of the predicate register.

The branch instruction causes a branch to be either taken or not taken in response to the value of the predicate register. Depending on the implementation, the branch may be taken in response to the value indicating a true condition and not taken in response to the value indicating a false condition, or vice versa.

For example, the branch may be taken in response to a true value to cause the first sequence of instructions to be executed to perform the function. In this example, the branch is not taken in response to a false value to cause the second sequence of instructions to be executed to perform the function.

As another example, the branch may be taken in response to a false value to cause the second sequence of instructions to be executed to perform the function. In this example, the branch is not taken in response to a true value to cause the first sequence of instructions to be executed to perform the function.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A processor comprising:
    a feature indicator associated with at least one of a first sequence of one or more instructions;
    a first register;
    a second register; and
    an execution core;
    wherein the feature indicator indicates whether the execution core supports the at least one of the first sequence of one or more instructions, wherein the execution core is configured to execute a first instruction to cause the first register to be set to a first value using the feature indicator and to cause the second register to be set to a second value using the feature indicator, wherein the execution core is configured to execute the first sequence of one or more instructions to cause a function to be performed in response to the first value in the first register indicating a true condition, and wherein the execution core is configured to execute a second sequence of one or more instructions to cause the function to be performed in response to the second value in the second register indicating the true condition.

2. The processor of claim 1 wherein the execution core is configured to execute the first sequence of instructions as no-operations (NOPs) in response to the first value in the first register indicating a false condition, and wherein the execution core is configured to execute the second sequence of instructions as NOPs in response to the second value in the second register indicating the false condition.

3. The processor of claim 1 wherein the first instruction comprises a predicate-producing instruction.

4. The processor of claim 1 wherein the first instruction comprises a feature specifier associated with at least one of the first sequence of one or more instructions.

5. The processor of claim 1 wherein the first register comprises a first predicate register and wherein the second register comprises a second predicate register.

6. The processor of claim 1 wherein the second value is a complement of the first value.

7. The processor of claim 1 wherein the feature indicator comprises a bit in a features register.

8. The processor of claim 1 wherein at least a portion of the first instruction comprises an encoding equivalent to a test NaT instruction that specifies a NaT0 from an Itanium® family instruction set architecture.

9. The processor of claim 1 wherein the execution core is configured to execute a set of instructions from an Itanium® family instruction set architecture.

10. A computer system comprising:
a processor that includes first and second predicate registers and a feature indicator that indicates whether the processor supports at least one of a first sequence of one or more instructions; and
a memory that includes a code segment that is executable by the processor;
wherein the code segment comprises:
a first instruction configured to cause the first and second predicate registers to be set to first and second values, respectively, according to a third value of the feature indicator;
the first sequence of one or more instructions configured to cause a function to be performed in response to the first value in the first predicate register representing a first condition; and
a second sequence of one or more instructions configured to cause the function to be performed in response to the second value in the second predicate register representing the first condition.

11. The computer system of claim 10 wherein the first sequence of instructions is configured to not cause the function to be performed in response to the first value in the first predicate register representing a second condition, and wherein the second sequence of instructions is configured to not cause the function to be performed in response to the second value in the second predicate register representing the second condition.

12. The computer system of claim 11 wherein the first condition is true, and wherein the second condition is false.

13. The computer system of claim 11 wherein the first instruction is configured to cause the first predicate register to be set to a third value of the bit, and wherein the first instruction is configured to cause the second predicate register to be set to a complement of the third value.

14. The computer system of claim 10 wherein the processor comprises a general purpose register and a bit associated with the general purpose register, and wherein the first instruction is configured to cause the first and second predicate registers to be set to the first and second values, respectively, according to the bit associated with the general purpose register in response to the processor not supporting the at least one of the first sequence of one or more instructions.

15. The computer system of claim 14 wherein the first instruction is configured to cause the first predicate register to be set to a third value of the bit, and wherein the first instruction is configured to cause the second predicate register to be set to a complement of the third value.

16. A method for performing a function in a processor comprising:
setting a first predicate register of the processor to a first value according to a bit in a features register that indicates whether the processor supports at least one of a first sequence of one or more instructions in response to executing a first instruction that includes a feature specifier that identifies the bit;
setting a second predicate register of the processor to a second value according to the bit in response to executing the first instruction;
executing the first sequence of one or more instructions to perform the function in response to the first value in the first predicate register indicating a true condition; and
executing a second sequence of one or more instructions to perform the function in response to the second value in the second predicate register indicating the true condition.

17. The method of claim 16 further comprising:
executing the first sequence of instructions as no-operations (NOPs) in response to the first value in the first predicate register indicating a false condition; and
executing the second sequence of instructions as NOPs in response to the second value in the second predicate register indicating the false condition.

18. A computer-readable media storing a program executable by a processor to cause the processor to:
insert a first instruction into a code segment, the first instruction configured to cause first and second predicate registers to be set to first and second values, respectively, according to a feature indicator in the processor that indicates whether the processor supports at least one of a first sequence of one or more instructions;
insert the first sequence of one or more instructions into the code segment subsequent to the first instruction, the first sequence of instructions configured to cause a function to be performed in response to the first value indicating a true condition; and
insert a second sequence of one or more instructions into the code segment subsequent to the first instruction, the second sequence of instructions configured to cause the function to be performed in response to the second value indicating a true condition.

19. The computer-readable media of claim 18 wherein the first instruction is configured to cause first and second predicate registers to be set to first and second values, respectively, according to a bit associated with a general purpose register in response to the whether the processor not supporting the at least one of the first sequence of one or more instructions.

20. The computer-readable media of claim 18 wherein the first sequence of instructions is configured not to cause the function to be performed in response to the first value indicating a false condition.

21. The computer-readable media of claim 18 wherein the second sequence of instructions is configured not to cause the function to be performed in response to the second value indicating a false condition.

22. A processor comprising:
  a feature indicator that indicates whether the processor supports at least one of a first sequence of one or more instructions;
  a predicate register; and
  an execution core;
  wherein the execution core is configured to execute a predicate-producing instruction to cause the predicate register to be set to a value using the feature indicator, and wherein the execution core is configured to execute a branch instruction to cause the execution core to execute either the first sequence of instructions to perform a function in response to the value indicating a first condition or a second sequence of one or more instructions to perform the function in response to the value indicating a second condition.

23. The processor of claim 22 wherein the first condition comprises a true condition, and wherein the second condition comprises a false condition.

24. The processor of claim 22 wherein the first condition comprises a false condition, and wherein the second condition comprises a true condition.

25. The processor of claim 22 wherein the execution core is configured to execute the branch instruction to cause a branch to be either taken or not taken in response to the value, and wherein the execution core is configured to execute the first sequence of instructions to perform the function in response to the branch being taken.

26. The processor of claim 22 wherein the execution core is configured to execute the branch instruction to cause a branch to be either taken or not taken in response to the value, and wherein the execution core is configured to execute the second sequence of instructions to perform the function in response to the branch being taken.

* * * * *

UNITED STATES PATENT AND TRADEMARK OFFICE
CERTIFICATE OF CORRECTION

| | |
|---|---|
| PATENT NO. | : 7,143,270 B1 |
| APPLICATION NO. | : 10/769203 |
| DATED | : November 28, 2006 |
| INVENTOR(S) | : Kevin W. Rudd et al. |

It is certified that error appears in the above-identified patent and that said Letters Patent is hereby corrected as shown below:

In column 11, line 59, in Claim 13, delete "a third value of the bit," and insert -- the third value, --, therefor.

Signed and Sealed this

Twenty-second Day of December, 2009

David J. Kappos
*Director of the United States Patent and Trademark Office*